United States Patent [19]
Traini et al.

[11] Patent Number: 4,828,653
[45] Date of Patent: May 9, 1989

[54] LONG LASTING ANODE FOR HIGH CURRENT DENSITY GALVANIZATION

[75] Inventors: Carlo Traini; Tomaso Leone; Renato Schira, all of Milan, Italy

[73] Assignee: Permelec S.p.A., Milan, Italy

[21] Appl. No.: 133,548

[22] Filed: Dec. 16, 1987

[30] Foreign Application Priority Data

Dec. 19, 1986 [IT] Italy ................. 22776 A/86

[51] Int. Cl.$^4$ ............ C25D 5/00; C25D 17/00; C25D 17/10
[52] U.S. Cl. ................. 204/23; 204/14.1; 204/55.1; 204/211; 204/280; 204/290 R; 204/290; 204/206
[58] Field of Search ............ 204/24, 39, 206, 211, 204/279, 284, 290 R, 290 F, 23, 286, 55.1, 280

[56] References Cited
U.S. PATENT DOCUMENTS
3,856,653  12/1974  Rogero et al. ............ 204/206

FOREIGN PATENT DOCUMENTS
0074575  6/1977  Japan ................. 204/284
0119198  9/1980  Japan ................. 204/290 F Primary Examiner—John F. Niebling
Assistant Examiner—Kathryn Gorgos
Attorney, Agent, or Firm—Bierman and Muserlian

[57] ABSTRACT

A dimensionally stable anode for high-speed galvanizing processes comprising a plurality of substantially parallel, foraminous layers, in electrical contact with each other, each layer comprising an inert, electroconductive substrate with an oxygen evolving electrocatalytic coating, characterized in that the current density of each individual layer is substantially the same and does not exceed the value corresponding to the minimum desired lifetime of the anode. The number of layers is sufficient to provide the total current density required for the high-speed galvanizing. The anode further comprises spacers suitable for preventing short-circuits.

20 Claims, 2 Drawing Sheets

CATHODE STRIP SLIDING DIRECTION →

PLAN VIEW

LONG LASTING ANODE FOR HIGH CURRENT DENSITY GALVANIZATION

"High-speed galvanizing" is the method of coating metal strips with metal and/or metal oxides by the galvanizing processes to protect the metal strips from corrosion and/or to provide a decoration on the metal strip or as a preparation for further treatment. The known devices for coating metal strips in this manner are essentially constituted as a galvanic cell provided with at least one anode opposed to a cathode which is the metal strip itself which moves at high speeds of up to 5 m/s parallel to the anode. The said apparatus is also provided with means to support and move the strip and means for circulating the electrolyte in the cell.

It is well known that when the anodes and the cathode strip are connected to the respective poles of a power supply source, the metal cations contained in the electrolyte or galvanic bath in which the electrodes are immersed deposite on the strip to form the coating. The thickness of the coating depends upon various factors such as the current density, the speed of movement of the strip and anode length and therefore the length of the cathode strip immersed in the galvanic bath, etc. The electrolyte is subjected to forced circulation to provide adequate feeding of metal cations to the cathode and to avoid formation of large gas pockets at the anode.

The current density of the anodes is rather high, in the range of 10 to 15 $KA/m^2$, and the known apparatus for high-speed galvanizing processes usually use lead or lead alloys anodes, but the use of lead anodes has several disadvantages, mainly due to the fact that lead anodes are not resistant to electrolyte attack and are readily consumed in the process. The specific disadvantages of lead anodes are that (a) the anodes have to be frequently replaced with the consequent high costs (b) mud formation is experienced due to anode corrosion;

(c) the electrolyte is polluted by lead particles in suspension and lead cations, and the latter are cathodically codeposited while the particles may be entrapped in the coating formed on the strip, whose quality is thus undesirably lowered;

(d) the interelectrodic gap varies with time causing an increased energy consumption;

(e) the anodes unevenly wear out whereby a local variation of the interelectrodic gap occurs, and the thickness of the coating on the cathode strip is consequently uneven, and the product quality is unacceptably spoiled.

Therefore, the known apparatus requires frequent shut-downs to remove the anodes which are subjected to expensive machining and subsequent re-assembly. A further disadvantage is represented by the weight of lead anodes and thus the need for adequate support means which results in complex and cumbersome geometries of the structure.

To overcome the disadvantages in the use of lead anodes, dimensionally stable anodes have been proposed which are comprised of a substrate made of a metal resistant to the electrolyte or otherwise protected by a suitable intermediate coating, and an external electrocatalytic coating which substantially reduces the overvoltage with a consequent saving of energy consumption. Such anodes are usually solid sheets or expanded sheets, screens, rods or the like and are much lighter than the corresponding lead anodes. As is well-known, the active lifetime of the external electrocatalytic coating decreases as the current density is increased and under the high current densities required for high-speed electrogalvanizing, the electrocatalytic coating exhibits a too short lifetime which considerably reduces the industrial interest.

Another problem connected with high-speed electrogalvanizing is the extremely fast sliding of the strip which is subjected to vibrations and thus, even when their entity is negligible, contact between the cathode strip and the anodes may occur, giving rise to short-circuits.

OBJECTS OF THE INVENTION

It is an object of the present invention to overcome the disadvantages of the prior art by providing a permanent anode, that is a substantially non-consumable anode, having a suitable structure for operating under the high current densities required in high-speed galvanizing processes, and offering at the same time a lifetime considerably higher than conventional dimensionally stable anodes.

It is a further object of the present invention to provide an anode comprising spacers suitable for preventing short-circuits.

It is another object of the invention to provide an improved high-speed galvanizing cell and a method of galvanizing moving metal strips.

These and other objects of the invention will become obvious from the following detailed description.

THE INVENTION

The novel dimensionally stable anodes of the invention for high speed galvanizing processes are comprised of a plurality of substantially parallel, foraminous layers in electrical contact with each other, each layer comprising an electroconductive substrate with an oxygen evolving electrocatalytic coating (e.g. platinum group metals and/or oxides thereof) characterized in that the current density for each individual layer is substantially the same and does not exceed the value corresponding to the minimum desired lifetime of the anode.

The number of foraminous electrode layers is sufficient to provide for a total current density required for the high speed galvanizing. The anode further comprises spacers suitable for preventing short-circuits.

The permanent anode thus obtained can operate at a relatively low current density for each electrodic layer (in the case of two layers the current density will be half the process current density, while for more than two layers it will be proportionally reduced), has a lifetime of industrial interest although operating under high process current density as required in high-speed galvanizing.

The anode of the present invention is not consumable and, therefore, does not adversely cause the inconveniences of prior art consumable anodes. Furthermore, it is rather light with respect to conventional lead anodes, avoiding thus the need for sturdy supporting means.

The same current density may be obtained for all of the electrodic layers by suitably selecting the following parameters:

(a) geometry of the electrodic layer;
(b) material constituting the layer substrate and
(c) the type of catalyst coating the layer substrate.

Assuming, for simplicity sake, that all the electrodic layers are made of the same material and coated by the same catalyst, only the geometry is considered.

The difference between the anode of the invention versus anodes made of several identical electrodic layers (e.g. an electrodic package made of three identical expanded sheets) is to be pointed out. In the case of identical layers, most electric current is discharged at the start-up by the first layer closer to the cathode and as soon as it wears out the second layer begins to operate, and so on until the most remote layer is completely spoiled. That means, all of the layers work in in subsequent stages, one after the other, each of them at a current density quite close to the process current density and the total lifetime of the anode package will result from the sum of each single layer lifetime at the process current.

Conversely, the anode of the invention, wherein all of the layers operate concurrently at substantially the same density, permits the proportional reduction of the current density according to the number of layers. The anode lifetime is thus higher than an anode package constituted by identical layers having the same characteristics and operating in subsequent phases. This is due to the fact that the duration D of an electrode of the dimensionally stable type is given by $$\log D = C - B \log A$$

wherein C and B are constants and A is the electrode current density. Therefore, a reduction of A corresponds to an increase of D which can be more than proportional.

Furthermore, the anode of the invention avoids the risk of short-circuits during operation of a high-speed galvanizing apparatus wherein the cathode strip slides at an extremely high speed and is thus subjected to vibrations, by providing for suitable means in contact with the surface facing the cathod and insulated from the anode which has such a structure so as not to inhibit electrolyte circulation. In one embodiment of the present invention, the insulating means may be in the forms of screens or parallel rods suitably spaced apart, made for example of PTFE. In a further embodiment, the insulating means may be made by a metal insulated from the anode by plastic material.

Referring to the drawings.

Figure 1:
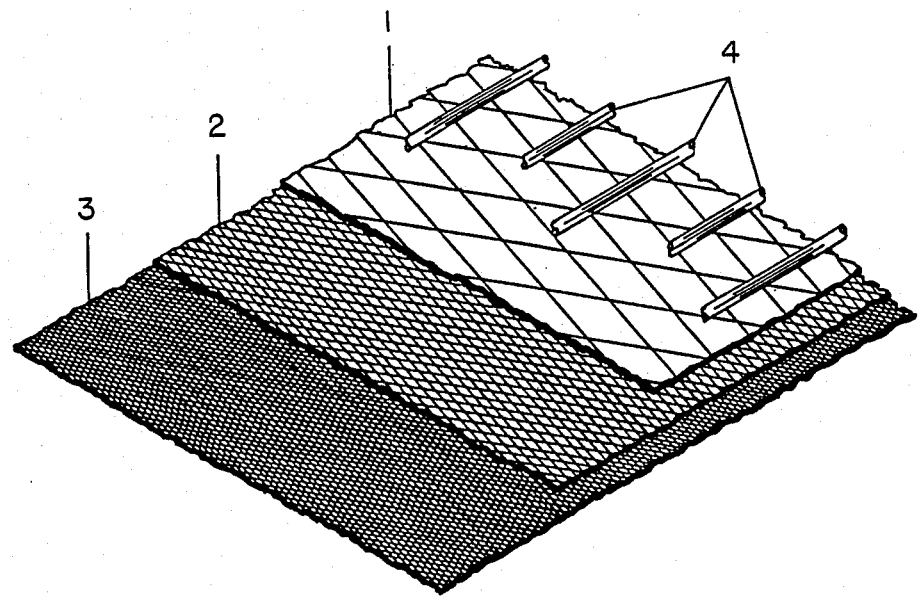
FIG. 1 is a perspective view of an anode of the invention made of three superimposed expanded sheets having different geometrical characteristics.

FIG. 1 illustrates a portion of an anode made of three electrodic layers, 1, 2, 3, of three expanded sheets. For simplicity sake, the three layers are considered being made of the same material resistant to the electrolyte, such as for example titanium, tantalum, niobium or tungsten, and coated by the same electrocatalytic material, such as oxides of platinum group metals. The expanded sheet 1 is the closest to the cathode, which is not shown in the figure and the three sheets are mechanically and electrically connected to each other, for example by spot-welding; to obtain the same current density for all the layers, the three sheets 1, 2, 3 have a different geometry and consequently different ohmic losses for each of the layers. The geometrical parameters which may be varied as regards the expanded sheets are, for example, the dimensions of the rhomboidal mesh, the thickness and the width of the mesh arms. Innumerable combinations of said geometrical parameters are possible to meet the requisites for a substantially identical current density of the electrodic layers. A suitable combination of said parameters is illustrated in Table 1.

TABLE 1

| Electrodic Layer | Mesh dimensions mm | Mesh arms thickness mm | Mesh arms width mm |
|---|---|---|---|
| 1 | 60 × 20 | 0.5 | 3 |
| 2 | 10 × 6 | 1.0 | 1 |
| 3 | 6 × 3.5 | 1.0 | 1 |

Expanded sheet 1, which is the closest to the cathode, has a large mesh size with respect to the other sheets 2 and 3 whose dimensions decrease as their distance from the cathode increases.

The spacers 4, which prevent are made of parallel rods of a suitable insulating material resistant to the electrolyte, such as for example PTFE.

Figure 2:
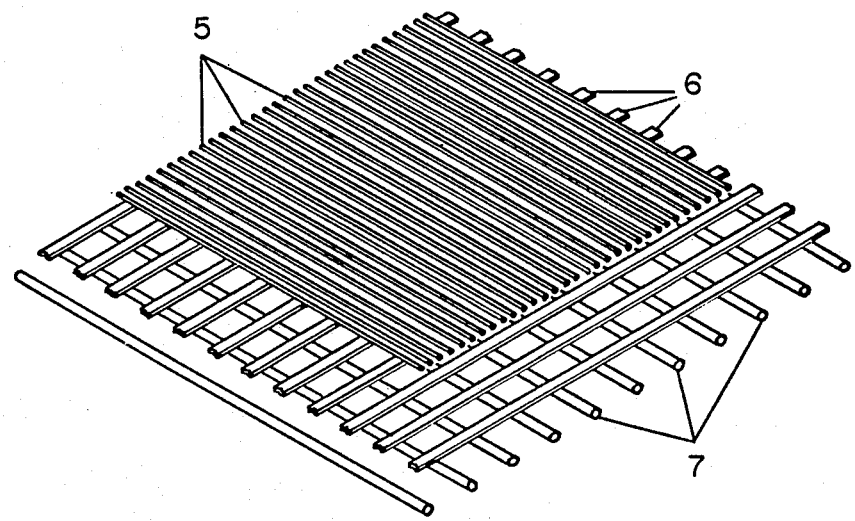
FIG. 2 is a perspective view of another embodiment of the invention wherein an array of rods having a circular section is laid over and across an array of rods having a rectangular section.

FIG. 2 shows another embodiment of the invention made of three electrodic layers 5, 6 and 7. The electrodic layers 5 and 7 are made of an array of rods having a circular section, arranged parallel to one other and suitably spaced apart, while the intermediate electrodic layer 6 is made of an array of rods with a rectangular section, suitably spaced apart. The rods of each electrodic layer array are displaced of 90° with respect to the adjacent layer. For simplicity sake, all of the rods arrays are considered as being made of of the same material and coated with the same electrocatalytic material.

In this case, the geometrical parameters which can be varied are the diameter of the rods having a circular section, the two dimensions of the rods having a rectangular sections, and their spacing.

A suitable combination for obtaining a substantially identical current density for each of the three layers is illustrated in Table 2

TABLE 2

| Electrodic layer | rods dimensions mm | spacing mm |
|---|---|---|
| 5 | 1.0 | 3.1 |
| 6 | 3.0 × 1.0 | 8.0 |
| 7 | 3.0 | 9.5 |

It is quite obvious that other embodiments may be obtained by suitably varying the geometries of the various layers.

Figure 3:
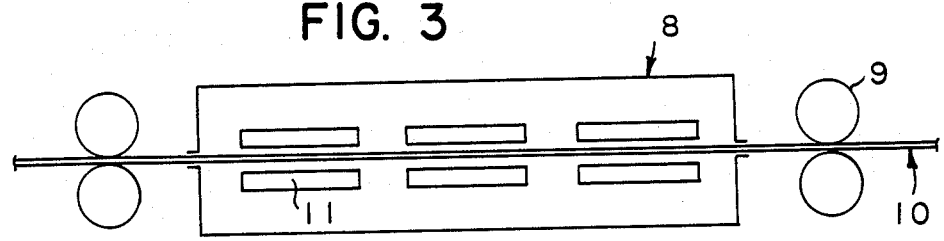
FIG. 3 is a schematic view of a galvanic cell utilizing the anodes of the invention.

FIG. 3 is a schematic view of a cell (8) for high speed electrogalvanizing wherein the cathode is an iron strip (10) sliding between a pair of copper current conducting rolls (9) and the anodes are indicated by 11.

Figure 4:
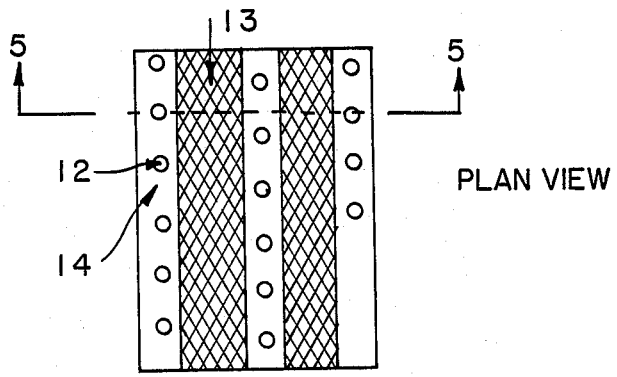
FIG. 4 is a plan view of the anode of the invention comprising a preferred embodiment of the spacers for preventing short-circuits.

FIG. 4 illustrates the spacers suitable for preventing short-circuits which comprise housings 14, having the shape of a parallelepiped made of an insulating material, which contain rotating means 12, in the form of balls or cylinders made of a mechanically resistant material, such as stainless steel. The anode surface is indicated by 13.

Figure 5:
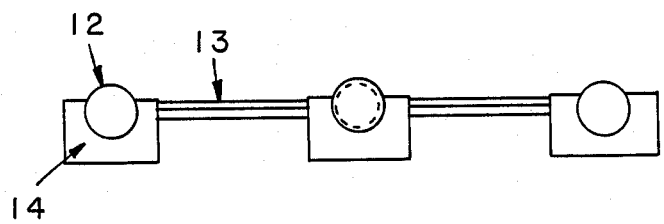
FIG. 5 is an enlarged cross-section view of FIG. 4

FIG. 5 is an enlarged cross-section of the short-circuit preventing spacers shown in FIG. 4 taken along line 5—5 thereof.

In a further embodiment of the present invention, not illustrated by the figures, the electrodic layer which is more distant from the cathode is a solid sheet which acts as an end wall for the galvanic cell and offers thus the advantage of a simple and light cell design.

In all of the above embodiments, for simplicity sake, all the electrodic layers have been considered as made of the same materials and coated by the same electrocatalytic materials and only the geometry of the electrodic layers have been modified. Obviously, a substantially uniform current density may be attained also by varying the type of materials and catalysts utilized. For example, the electrocatalytic coating utilized for the electrodic layer closest to the cathode may have a higher overvoltage for oxygen evolution and consequently, a lower electrocatalytic activity than the coating applied to the most distant layer.

In the following examples there are described several specific embodiments to illustrate the invention. However, it should be understood that the invention is not intended to be limited to the specific embodiments.

EXAMPLE 1

Three couples of samples of titanium expanded sheets were provided to determine the active lifetime of the multi-layer anode of the present invention compared with conventional anodes. The geometrical characteristics of each of the three couples is illustrated in Table 1 and the samples, 180×100 mm, were degreased by acetone and subsequently pickled in an aqueous solution of 10% oxalic acid at 85°–95° C. for 30 minutes. The samples were then activated with an electrocatalytic oxide coating obtained by thermal decomposition in an oven from an aqueous solution having the following composition:

iridium trichloride 60 g/l (as metal)
tantalum pentachloride 50 g/l (as metal)
hydrochloric acid 150 g/l The coating was applied by a known technique wherein the paint consisting of the said aqueous solution was applied by immersion, followed by thermal treatment at 500° C. for ten minutes. This procedure was repeated several times.

Three different samples were assembled by spot-welding to obtain a multi-layer electrode formed by three expanded sheets as illustrated in FIG. 1, and the package was subsequently tested as anode in a solution of 15% sulfuric acid at 50° C. The remaining three samples were separately tested under the same conditions. A current input of 216 kA was fed to the four samples (i.e. the anodic package and the three single samples), corresponding to a total current density of 12 A/m$^2$. The most prolonged durability for the single sheet samples proved to be 2000 hours and the content of iridium per square meter was reduced to 10% compared with the initial value. In contrast thereto, the anodic package of the invention was efficiently operating after 10,000 hours with an iridium content per square meter of 70% compared with the initial value.

EXAMPLE 2

Three couples of titanium expanded sheets samples, type 2 of Table 1, (mesh dimensions 10×6 mm) were degreased with acetone and then pickled in an aqueous solution of 10% oxalic acid for 30 minutes at 85° C.–95° C. Each titanium couple was activated by suitable catalysts as follows:

The couple of samples 1 and 2 was activated by galvanically depositing platinum from a commercial acid bath, and the couple of samples 3 and 4 was activated by Pt-Ir (70:30) obtained by thermal decomposition of a suitable solution as known in the art. The couple of samples 5 and 6 was activated by mixed oxides as illustrated in Example 1.

The catalyst quantity was determined to obtain a lifetime in the range of some hundred hours for samples 2,4 and 6 utilized as single anodes for the electrolysis of 15% sulfuric acid at a temperature of 50° C. and at a current density of 8 kA/m$^2$. The following duration was observed:

sample no. 2 190 hours
sample no. 4 220 hours
sample no. 6 350 hours

Samples nos. 1,3 and 5 were assembled and welded together by spot-welding to obtain a multi-layer anodic assembly comprising three anodic layers having the same geometry with a substrate made of the same material but provided with different electrocatalytic coating, the electrodic layer no. 1 closest to the cathode having a higher overvoltage for oxygen evolution. The multi-layer structure thus obtained with a projected area of 180×100 mm was tested as an anode under the same conditions as single samples 2,4 and 6. After 1500 hours, the multi-layer structure of the invention was still efficiently working.

EXAMPLE 3

A test under industrial conditions was carried out utilizing a galvanic cell as schematized in FIG. 3, wherein the cathode was an iron strip (10) having a thickness of 0.5 mm and a width of 1250 mm, sliding between a pair of copper current conducting rolls (9). The anodes (11), 1250×1000 mm, were made of three activated screens spot-welded to each other having the same characteristics as the sample described in Example 1.

Each anode further had spacers for preventing short circuits as represented in FIGS. 4 and 5 and comprising balls (12) with a diameter of 20 mm made of stainless steel electrically insulated from the anode by housings (14) made of plastic material and having the shape of parallelpiped having the same length as the anode width, i.e. 1250 mm and a width of 40 mm. The surface of housing (14) facing the cathode did not protrude from the anode (13) surface and the balls protruded from the housing for about 5 mm and were free to rotate. Housings (14) were disposed transversally with respect to the direction of sliding of the cathode iron strip and were positioned at a distance of 440 mm from each other. The balls (12) contained in housing (14) were spaced 200 mm from each other and the gap between the cathode strip and the anodes (11) surface was 10 mm.

Zinc deposition was carried out for 250 hours under the following conditions
electrolyte composition:
$ZnSO_4 \cdot 7H_2O$ 250 grams/liter
$H_2SO_4$ 20 grams/liter
temperature 50° C.
current density 15 kA/square meter
sliding speed 2 meter/second.

For comparison purposes, a test was carried out under the same conditions utilizing a similar galvanic cell equipped with Pb-Ag anodes, 30 mm thick.

It was observed that the anodes of the invention resulted in a uniform deposit of zinc onto the cathode strip, giving rise to no risk of short-circuit, and the cell voltage remained constant during the operation. Conversely, with the Pb-Ag anodes, a loss of planarity was detected due to frequent short-circuits caused by the contact between the cathode strip and the anodes, mainly on the edges of the strip as a consequence of the transversal vibrations, also, scorings were observed especially on the edges.

Various modifications of the invention may be made without departing from the spirt or scope thereof, and it should be understood that the invention is to be limited only as defined in the appended claims.

What we claim is:

1. An anode capable of use in electrodepositing metal comprising a relatively inert electroconductive surface capable of propagating an electrochemical reaction when an electric current is passed between said anode and a cathode, said anode being porous and having substantial thickness and having means to reduce the tendency to establish higher current density in anode areas closer to the cathode than in anode areas more remote from said cathode, the said substantial thickness and means consisting of a plurality substantially parallel, foraminous layers in electrical contact with each other, each layer comprising an electroconductive substrate with an oxygen evolving electrocatalytic coating, each individual layer having a different geometry to ensure that the current density of each individual layer is substantially the same and does not exceed the value corresponding to the minimum desired lifetime of the anode.

2. The anode of claim 1 characterized in that the layer more remote from the cathode has greater surface area than the closer one.

3. The anode of claim 1 characterized in that the substantial thickness and means consist of a plurality of substantially parallel, foraminous layers in electrical contact with each other, each layer comprising an electroconductive substrate with an oxygen evolving electrocatalytic coating, the electrocatalytic coating of the layer closest to the cathode having a lower electrocatalytic activity.

4. The anode of claim 1 characterized in that the substantial thickness and means consist of a plurality of substantially parallel, foraminous layers in electrical contact with each other, each layer comprising an electroconductive substrate with an oxygen evolving electrocatalytic coating, the layer substrates being made of different materials.

5. The anode of claim 1 characterized in that it further comprises short-circuit preventing spacers made of an electrolyte-resistant, electrically insulating material and having a structure open to electrolyte flow.

6. The anode of claim 5 characterized in that the short-circuit preventing spacers comprise a housing made of an insulating material and rotating means made of a material resistant to mechanical stresses.

7. In a high speed galvanizing cell for galvanizing a moving metal cathode strip, with at least one anode facing at least one side of said cathode strip, wherein the improvement comprises using an anode comprising a relatively inert electroconductive surface capable of propagating an electrochemical reaction when an electric current is passed between said anode and the cathode strip, said anode being porous and having substantial thickness and having means to reduce the tendency to establish higher current density in anode areas closer to the cathode strip than in anode areas more remote from said cathode strip.

8. The cell of claim 7 characterized in that said substantial thickness and means consist of a plurality of substantially parallel, foraminous layers in electrical contact with each other, each layer comprising an electroconductive substrate with an oxygen evolving electrocatalytic coating, each individual layer having a different geometry to ensure that the current density of each individual layer is substantially the same and does not exceed the value corresponding to the minimum desired lifetime of the anode.

9. The cell of claim 8 characterized in that the layer more remote from the cathode has greater surface area than the closer one.

10. The cell of claim 7 characterized in that the substantial thickness and means consist of a plurality of substantially parallel, foraminous layers in electrical contact with each other, each layer comprising an electroconductive substrate with an oxygen evolving electrocatalytic coating, the electrocatalytic coating of the layer closest to the cathode having a lower electrocatalytic activity.

11. The cell of claim 7 characterized in that the substantial thickness and means consist of a plurality of substantially parallel, foraminous layers in electrical contact with each other, each layer comprising an electroconductive substrate with an oxygen evolving electrocatalytic coating, the layer substrates being made of different materials.

12. The cell of claims 7, 8, 9, 10 or 11, characterized in that it further comprises short-circuit preventing spacers made of an electrolyte-resistant, electrically insulating material and having a structure open to electrolyte flow.

13. The cell of claim 7 characterized in that there is provided short-circuit preventing spacers comprising a housing made of an insulating material and rotating means made of a material resistant to mechanical stresses.

14. In a method for high speed galvanizing a moving metal cathode strip, with at least one anode facing at least one side of said cathode strip, wherein the improvement comprises using an anode comprising a relatively inert electroconductive surface capable of propagating an electrochemical reaction when an electric current is passed between said anode and the cathode strip, said anode being porous and having substantial thickness and having means to reduce the tendency to establish higher current density in anode areas closer to the cathode strip than in anode areas more remote from said cathode strip.

15. The method of claim 14 characterized in that said substantial thickness and means consist of a plurality of substantially parallel, foraminous layers in electrical contact with each other, each layer comprising an electroconductive substrate with an oxygen evolving electrocatalytic coating, each individual layer having a different geometry to ensure that the current density of each individual layer is substantially the same and does not exceed the value corresponding to the minimum desired lifetime of the anode.

16. The method of claim 15 characterized in that the layer more remote from the cathode has greater surface area than the closer one.

17. The method of claim 14 characterized in that the substantial thickness and means consist of a plurality of substantially parallel, foraminous layers in electrical contact with each other, each layer comprising an electroconductive substrate with an oxygen evolving electrocatalytic coating, the electrocatalytic coating of the layer closest to the cathode having a lower electrocatalytic activity.

18. The method of claim 14 characterized in that the substantial thickness and means consist of a plurality of substantially parallel, foraminous layers in electrical contact with each other, each layer comprising an electroconductive substrate with an oxygen evolving electrocatalytic coating, the layer substrates being made of different materials.

19. The method of claims 14, 15, 16, 17 or 18, characterized in that it further comprises using short-circuit preventing spacers made of an electrolyte-resistant, electrically insulating material and having a structure open to electrolyte flow.

20. The method of claim 14 characterized in that there is provided short-circuit preventing spacers comprising a housing made of an insulating material and rotating means made of a material resistant to mechanical stresses.

* * * * *